United States Patent [19]

Primos

[11] Patent Number: 5,735,725
[45] Date of Patent: Apr. 7, 1998

[54] MODULAR GAME CALL SYSTEM

[75] Inventor: Wilbur R. Primos, Jackson, Miss.

[73] Assignee: Primos, Inc., Jackson, Miss.

[21] Appl. No.: 657,452

[22] Filed: May 29, 1996

Related U.S. Application Data

[63] Continuation-in-part of Ser. No. 364,887, Dec. 27, 1994, abandoned.

[51] Int. Cl.[6] .................................................. A63H 5/00
[52] U.S. Cl. ..................................... 446/207; 446/202
[58] Field of Search ................................. 446/207–209, 446/202, 204

[56] References Cited

U.S. PATENT DOCUMENTS

| | | | |
|---|---|---|---|
| 2,969,611 | 1/1961 | Warren, Jr. | 46/180 |
| 3,722,133 | 3/1973 | Morgan | 46/178 |
| 3,811,221 | 5/1974 | Wilt | 46/180 |
| 3,815,283 | 6/1974 | Piper | 46/178 |
| 4,335,539 | 6/1982 | Jones | 46/179 |
| 4,483,097 | 11/1984 | Piper | 446/207 |
| 4,637,154 | 1/1987 | Laubach | 43/1 |
| 4,752,270 | 6/1988 | Morton | 446/207 |
| 4,761,149 | 8/1988 | Laubach | 446/208 |
| 4,764,145 | 8/1988 | Kirby | 446/208 |
| 4,950,198 | 8/1990 | Repko, Jr. | 446/207 |
| 4,976,648 | 12/1990 | Meline | 446/207 |
| 5,122,088 | 6/1992 | Meline | 446/202 |

OTHER PUBLICATIONS

Product brochure of Abe & Son Natural Elk Sounds, "N.E.S. Standard Mouthpiece," date unknown.

*Primary Examiner*—Mickey Yu
*Attorney, Agent, or Firm*—Foster & Foster

[57] ABSTRACT

A modular game call system including generally a mouthpiece assembly, a tubular portion, and a resonance producing end. The mouthpiece assembly can be completely removed from the call to enable the tubular section and resonance producing end piece to be used separately with any other type of call. The mouthpiece assembly includes a detachable snap-on diaphragm that insures accurate, consistent tension of the membrane to allow high quality tones to be produced. Alternatively, a sheet of membrane material can be attached to the end of the mouthpiece assembly to create high quality tones. The resonance producing end piece allows the call to produce a resonant sound highly similar to a bugling bull elk.

29 Claims, 8 Drawing Sheets

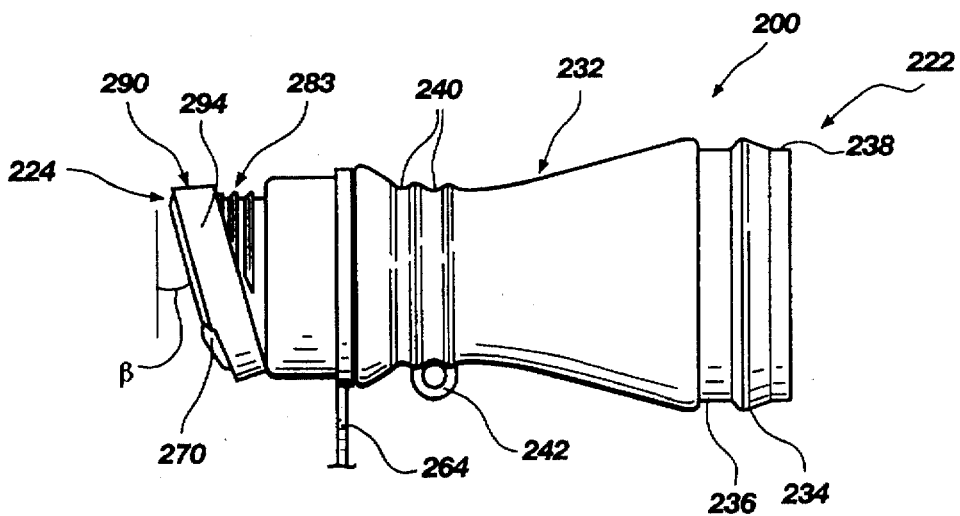
Fig. 17
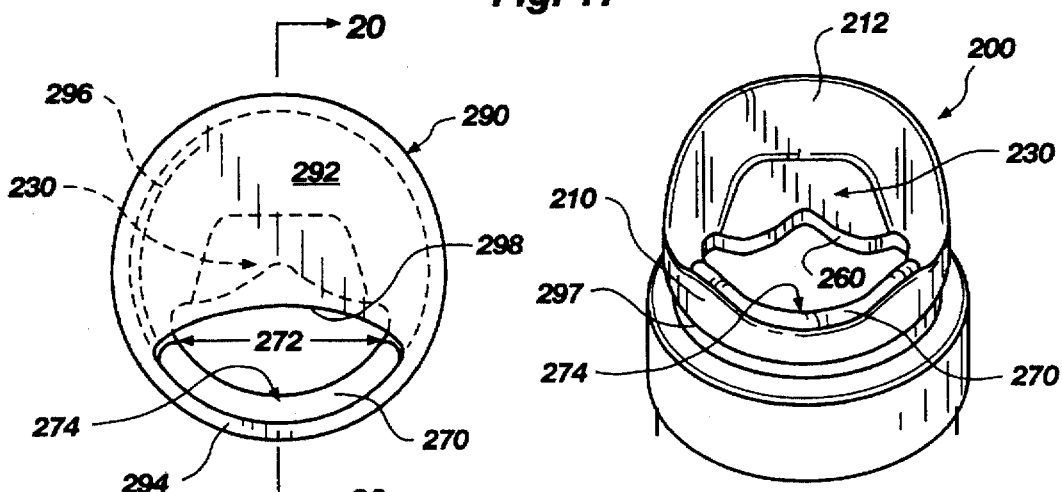
Fig. 18
Fig. 19
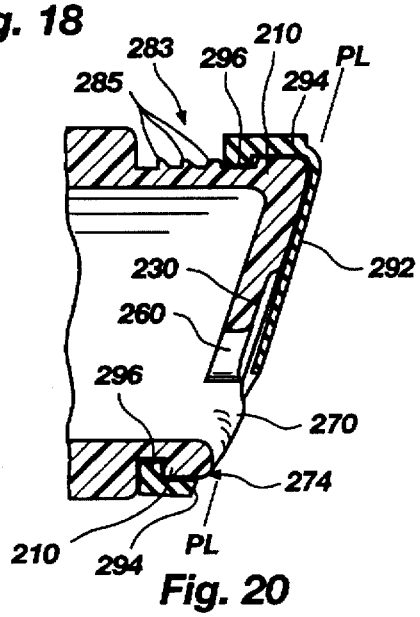
Fig. 20

MODULAR GAME CALL SYSTEM

RELATED APPLICATION

This is a continuation-in-part of U.S. patent application Ser. No. 08/364,887, filed 27 Dec. 1994, abandoned.

TECHNICAL FIELD

This invention relates to game calls, and more particularly, to modular game call systems for imitating natural sounds of game animals.

BACKGROUND OF THE INVENTION

Numerous devices have been developed over the years to imitate the sounds of wild animals, particularly game animals. Many efforts have been attempted to simplify and improve the quality of the sounds produced by game calls. Many game calls, particularly elk and turkey calls, require extensive practice before they are mastered. Some users simply cannot master the calls even after hours of practice.

Several problems have recently surfaced with respect to the effectiveness of traditional game calls. Due to the increased popularity of hunting and the perceived effectiveness of using game calls, more hunters are taking the field each year using a plethora of different types of game calls. Accordingly, game animals are becoming increasingly discriminating and wary of many traditional calls. Unless the call is capable of imitating with a high degree of precision actual sounds of the game animal, it will likely be ineffective. Many calls on the market today fail to replicate with enough precision the actual sounds made by the game animal and thus serve primarily to frustrate the hunter. These game calls serve more to alert the animals of a potentially dangerous situation than to call game into close range.

One type of a well known prior game call is a reed-type diaphragm call that is inserted completely into the caller's mouth when used. Although good quality tones can be produced by these types of mouth calls, they likewise are some of the most difficult calls to master. Accordingly, many efforts have been made by call designers and manufacturers to attach a reed or diaphragm material to a structure mounted on a tube or otherwise develop a hand-held call with the idea of making the call easier to use. While such calls have indeed proven easier to use, such calls typically produce inferior quality sounds. Therefore, with respect to hand-held calls, high quality sounds have been traditionally sacrificed in favor of ease of use.

Other traditional problems with respect to hand-held game calls relate to placement of the diaphragm member on the game call itself. Traditional calls have required random stretching of a membrane over some type of aperture with a fastener, such as an elastic band, securing the membrane in position. The tension of the membrane is therefore adjusted to a different degree each time the latex is placed over the mouthpiece, according to the user of the call. As the tension of the membrane changes, so too does the tone produced by the call. Constant, reliable results in terms of tone are difficult to achieve. The call user must traditionally make several attempts at adjusting the membrane to achieve the tension that results in the best possible tone. While the call is being used, the membrane is commonly displaced which likewise varies the tone.

Still other problems have surfaced with respect to exterior mounted diaphragms for hand-held calls. In calling elk, for example, it is desirable to imitate the low, raspy, guttural sound of a bull elk as well as the higher "music" tones. For most traditional hand-held elk calls, the raspy sound of a bull elk is extremely difficult to imitate. Accordingly, there is a need to provide a hand-held elk call that enables the user to produce a low tone raspy sounding of a rutting bull elk.

Yet another problem associated with traditional hand-held elk calls is the need to simulate the resonance associated with the bugle of a bull elk. Corrugated tubing has long been used as a device to simulate the resonance of a bull elk's bugle. However, such corrugated tubing falls short of the actual sound an elk makes. Various efforts have been made to attach devices to the end of corrugated tubing to simulate the desired resonance. None of these devices, however, has completely solved the difficulty of precision in simulating the resonance of a bull elk's bugle.

Still another problem with respect to traditional hand-held game calls is their lack of versatility. Typically, there is only one manner in which the game call can be used effectively. Also, the components required to use the call must typically remain constant. The make up of most traditional elk calls limits the device from being used in combination with other devices and methods of calling animals, particularly elk.

In view of the foregoing problems, there is a need to develop a game call system that is highly versatile, capable of being used in combination with a plurality of different game calls and methods. There is likewise a need to develop a game call that can be modified to create various different calls from a single modular game call system. In addition, there is a need to produce a game call that includes a diaphragm member that is preadjusted, more versatile to use, and predictably attachable to the game call such that a known, reliable sound can be produced. There is still further a need to produce a game call that imitates the raspy, guttural sound as well as the natural resonance of a bugling bull elk. In addition, there is a need to produce a game call that is easy for a beginner to use, yet allows an advanced caller to imitate with a high degree of precision the sounds of various game animals.

OBJECTS AND SUMMARY OF THE INVENTION

It is a primary object of the present invention to provide a game call system that is modular and useable in various forms and in combination with various methods for calling game animals.

Another object of the invention is to provide a game call that has a pre-adjusted membrane for imitating the sounds of game animals.

It is another object of the invention to produce a game call that is easy for the beginner to use, yet allows an advanced caller to imitate with high precision the calls of game animals.

Still another object of the invention is to provide a game call that includes a compartment for storing accessories, such as extra reeds, diaphragms, or related materials for the call.

Another object of the invention is to provide a game call that simulates with a high degree of precision the resonance of a bugling bull elk.

Another object of the invention is to provide a game call with a mouthpiece removable from the other portions of the call such that the remaining portions of the call can be used in combination with other types and methods of game calls.

Yet another object of the invention is to provide a game call that includes a snap-on membrane for achieving and maintaining a known constant tension of the membrane to produce predictable sounds.

Another object of the invention is to provide a hand-held game call that enables the user to reproduce the low raspy tone of a bugling bull elk.

Still another object of the invention is to provide a hand-held game call that includes a support shelf for underlying, at least in part, the diaphragm membrane and a concave portion of the mouthpiece for the caller to place his or her lower lip to enhance the effectiveness of the game call.

Yet another object of the invention is to provide a hand-held game call that uses in the alternative a snap-on diaphragm or a diaphragm comprised of a sheet of membrane material attached to the call by an elastic band.

Another object of the invention is to provide a hand-held game call that includes a support shelf for underlying the diaphragm membrane wherein the support shelf includes a dished-out area that increases the effectiveness of the game call.

Another object of the invention is to provide a diaphragm membrane for a game call that has a varying thickness.

Still another object of the invention is to provide a membrane material that forms an arcuate edge when placed in operative position on a game call to channel the air through the central portion of the call.

The foregoing objects are achieved by a modular game call system according to the present invention which comprises a removably attachable mouthpiece section, and intermediate tubular section, and a terminating volume chamber section. The mouthpiece assembly comprises a mouthpiece over which a latex membrane is secured. The latex membrane may be in the form of a snap-on membrane or a sheet of membrane material secured to the mouthpiece by a fastener such as a rubber band. Preferably, the membrane material forms an arcuate edge when placed in operative position on the call. A support shelf provides a support structure for a portion of the membrane. The support shelf may include a dished-out area for allowing increased manipulation and control of the diaphragm membrane material. A recessed area around the annular lip of the mouthpiece is provided to enable the caller to place his or her lower lip for proper operation of the call. A removable cap is provided to cover the mouthpiece and attached diaphragm. The cap includes a compartment for storing spare diaphragms and other call components.

Still further, the invention comprises a resonance producing volume chamber integrally connected to the tube portion of the call. The volume chamber provides strikingly similar volume and resonance as compared to a bugling bull elk.

Other objects, features, and advantages of the invention will become apparent from the following detailed description of the invention with reference to the drawings.

BRIEF DESCRIPTION OF THE DRAWINGS

Preferred embodiments of the invention are described below with reference to the accompanying drawings:

FIG. 17 is a side elevation view of an alternative embodiment of a mouthpiece body with a snap-on membrane secured to the inlet end in accordance with the present invention;

FIG. 18 is a front view of the mouthpiece body of FIG. 17 having a snap-on membrane secured to the inlet end;

FIG. 19 is an isometric view of the inlet end of the mouthpiece body without the snap-on membrane;

FIG. 20 is a partial sectional side view, taken along the line 20—20 of FIG. 18, of the mouthpiece body as shown in FIG. 17.

DETAILED DESCRIPTION OF THE INVENTION

Figure 1:
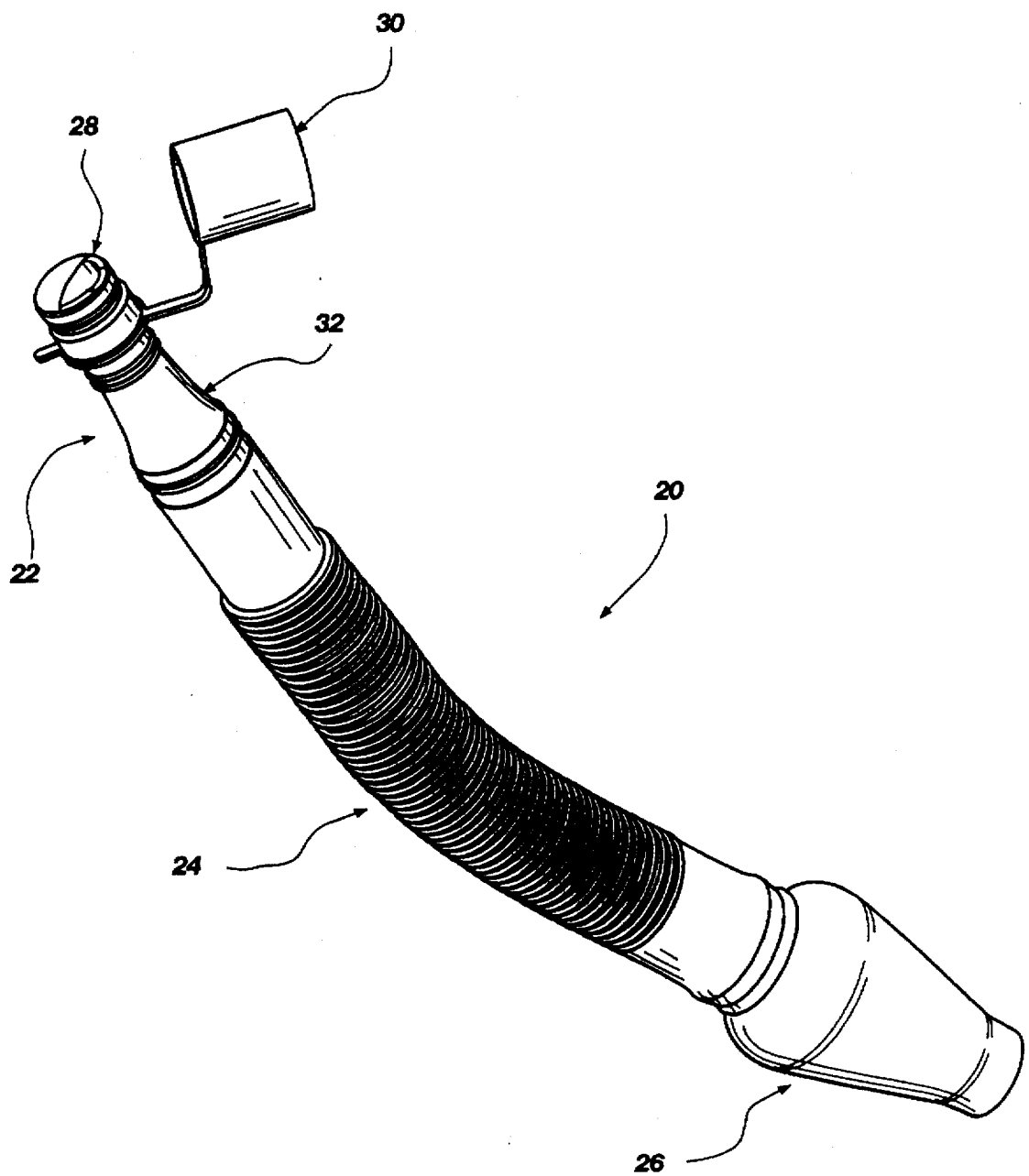
FIG. 1 is an isometric view of a modular game call system according to the present invention.
Figure 2:
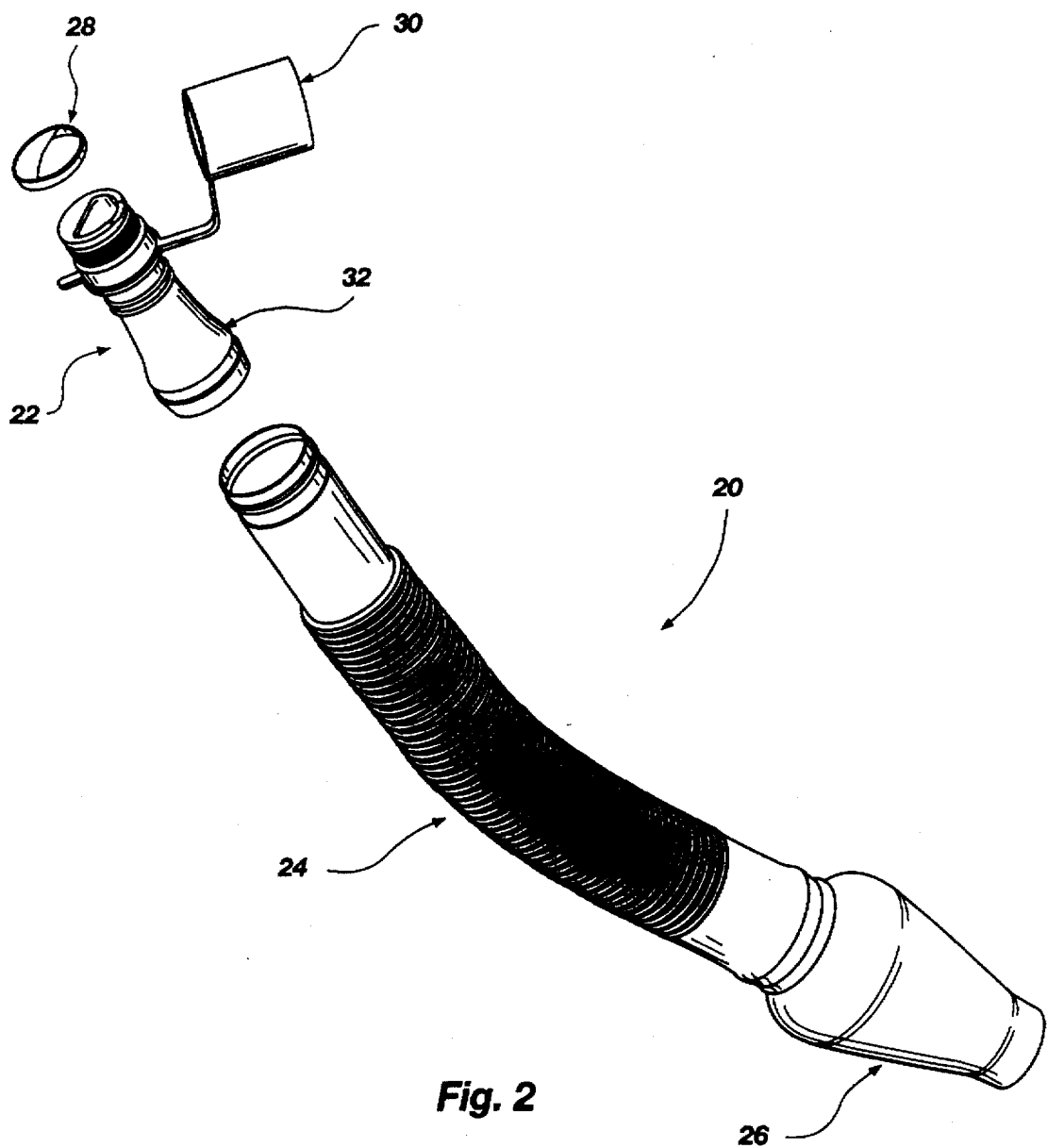
FIG. 2 is an exploded isometric view of the modular game call system of FIG. 1.

FIGS. 1 and 2 show an embodiment of the present invention, which comprises generally a modular game call system 20 having a mouthpiece assembly section 22, and intermediate tubular section 24, and a sound chamber section 26. The mouthpiece assembly is removably attachable to the intermediate tubular section. The mouthpiece assembly can be removed and used independent of the tubular portion. Likewise, the combined tubular section/sound chamber section can be used apart from the mouthpiece assembly and in combination with other types of elk calls. The tubular section is mostly corrugated. The sound chamber section includes a transition section, a rapid expansion section, a narrowing section, and a restriction section, all of which are discussed in greater detail below. The combination of the tubular section and the sound chamber enhances the resonance and quality of the tones produced to more closely simulate the natural sounds of elk.

An end piece in the form of a snap-on diaphragm reed 28 is removably securable to the inlet end of the mouthpiece assembly 22. A cap assembly 30 is attached to the mouthpiece assembly to cover the inlet end of the mouthpiece assembly when the game call is not in use. The cap assembly includes a storage area 72 (discussed below in connection with FIG. 4) for storing accessories, such as extra snap-on diaphragms and other call components.

FIGS. 3-10 show the mouthpiece assembly 22 in greater detail. The mouthpiece assembly comprises a mouthpiece body 32 is preferably injection molded, but could be made using any suitable method of manufacture or type of material. The mouthpiece body includes an inlet end and an outlet end. The outlet end of the mouthpiece body is attachable to the tubular portion 24 (FIGS. 1 and 2) of the modular game call system. The mouthpiece body includes an annular ridge 34, which snaps into a corresponding groove in the tubular portion. A circumferential groove 36 is also formed in the mouthpiece body 32 to receive a corresponding portion of the tubular section. The ridge 34 and groove 36 are provided to securely hold the mouthpiece body and the tubular section together. An end extension segment 38 is formed at the end of the mouthpiece assembly. The extension segment provides a guiding and seating structure to quickly and accurately position the mouthpiece assembly into the corresponding opening in the tubular section. Once properly seated, the mouthpiece assembly can be forcibly inserted into the tubular section.

Figure 10:
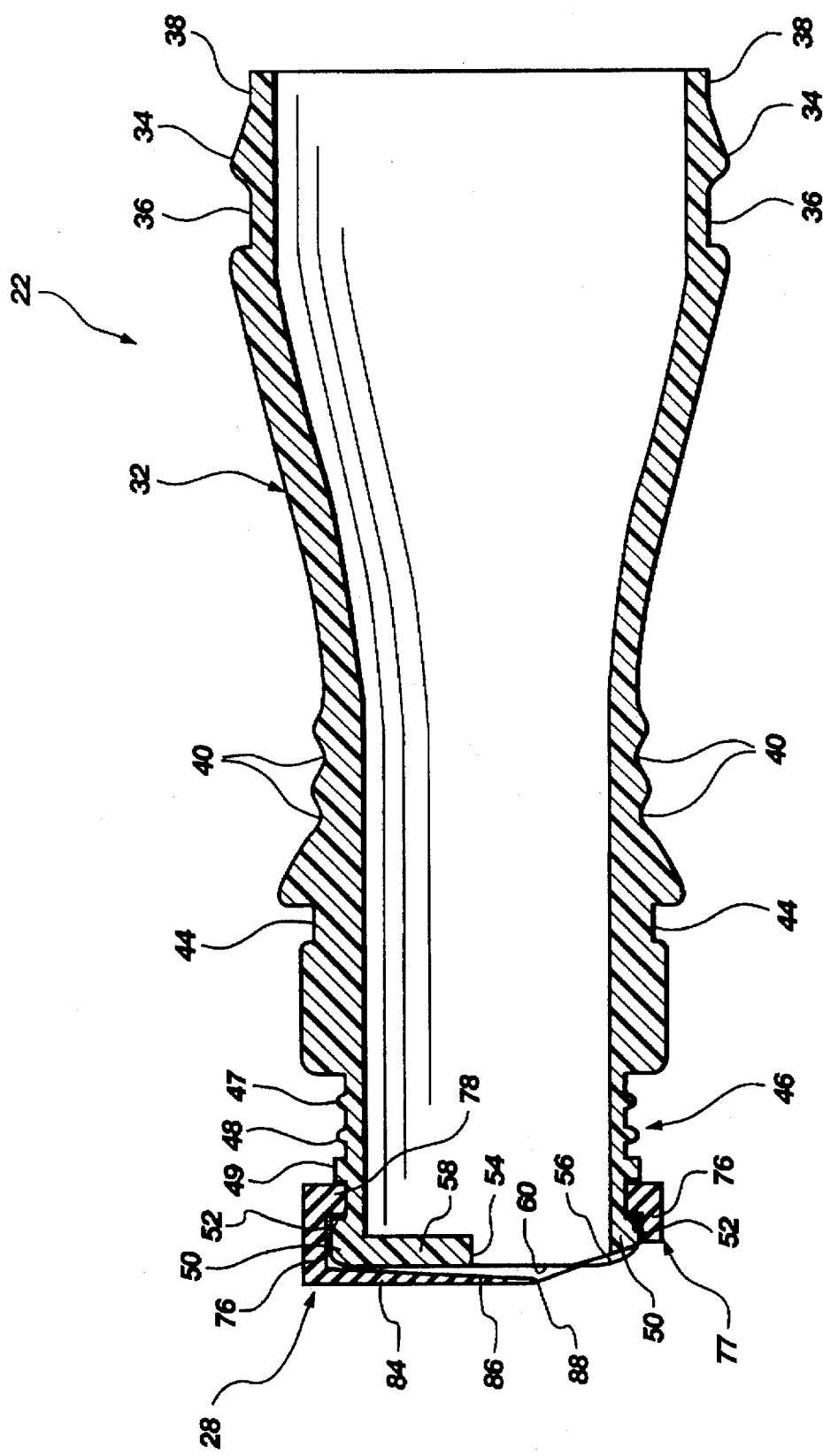
FIG. 10 is a sectional side elevation view of the mouthpiece assembly and attached snap-on diaphragm according to the present invention.

As shown in FIG. 10, upstream of the outlet end, the mouthpiece body 32 includes a pair of annular, circumferential groves 40. The grooves provide locations at which one end of a lanyard may be attached. A ring 42 (FIGS. 3-4) is integrally formed in the mouthpiece body 42 at a location corresponding to one of the groove 40. The ring further facilitates attachment of a lanyard to the mouthpiece body. An end of a lanyard can be inserted through and secured to the ring 42.

Figure 3:
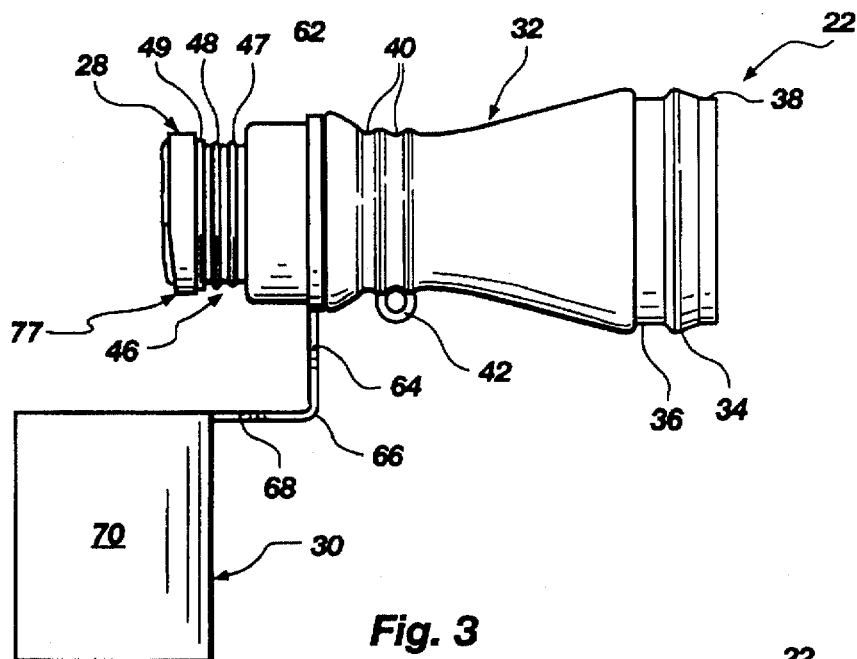
FIG. 3 is a side elevation view of the mouthpiece assembly of the game call system of FIG. 1.

Referring still to FIG. 10, a locking channel 44 is also formed in the mouthpiece body 32. The locking channel provides a positive mounting location for an annular end cap attachment ring 62 (FIG. 3). The attachment ring 62 is forced over the end of the mouthpiece so that it snaps into the groove 44 and is held firmly in position on the mouthpiece body.

Still further upstream of the outlet end of the mouthpiece body 32, a necked-down area 46 is formed in which a plurality of annular, circumferential ribs 47, 48, 49 are formed. The ribs provide locations at which a particular securing device (discussed in greater detail below) may be positioned to hold a diaphragm material in tension over the end of the mouthpiece body 32. With reference to FIG. 10, rib 49 is larger and shaped differently than the other ribs 47, 48. Rib 49 has angular corners and thereby provides a positive stop for preventing the snap-on diaphragm reed 28 from sliding down the mouthpiece body toward the outlet end. Such movement of the snap-on reed 28 would otherwise place the membrane material in increased tension which would change the tones produced by the call.

An annular end knob 50 is formed at the inlet end of the mouthpiece body 32. The end knob 50 circumscribes the inlet end of the mouthpiece body 32. The end knob 50 defines an annular, circumferential shoulder 52 (FIG. 10). When the snap-on diaphragm reed 28 is positioned over the call, a locking edge 80 (FIGS. 13-15) of the snap-on reed 28 abuts the circumferential shoulder 52 of the end knob 50. Accordingly, the snap-on reed 28 is held in substantially the same position because of its engagement with the large rib 49 and the circumferential shoulder 52 of the mouthpiece body. This type of male-female fit ensures constant, predictable positioning and tensioning of the membrane material to enable high-quality tones to be produced.

As an alternative to the snap-on reed 28, a membrane material 92 (FIGS. 11-12) can be stretched over the inlet end of the mouthpiece body 32 and held in position by means of an elastic band 94. The elastic band is intended to be positioned inside the necked-down area 46 of the mouthpiece body 32 to hold the membrane material 92 in a constant tension over the inlet end. The elastic band is prevented from being displaced longitudinally along the mouthpiece body by means of one or more of the ribs 47, 48, 49. Furthermore, the multiple ribs 47, 48, 49 allow for elastic bands of various thicknesses to be used in connection with the call system.

A web-like support shelf 58 integrally extends between portions of the end knob 50. The support shelf extends in a web-like manner to cover a portion of the opening formed at the inlet end of the mouthpiece body. In the present embodiment, the support shelf covers less than 50% of the cross-sectional area located radially inwardly from the end knob 50. The support shelf terminates at an edge 54 which defines, along with end surfaces 60 (FIGS. 5-6) of the end knob 50, an end aperture, which is substantially semicircular or half-moon shaped (FIG. 5).

A concave portion 56 is formed in the annular end knob 50 opposite the support shelf 58. As seen in FIGS. 6-10, the concave portion provides a recessed area in which the caller's lip is intended to be positioned to properly use the call system. The concave portion 56 enables the caller to locate with precision the proper orientation of the call for effective use. The concave portion further provides a valley in which the caller's lower lip can be positioned to enable feather-like control contact to be made with the vibrating membrane material 82 to change the tones of the call. Furthermore, placing the caller's lower lip in the concave area 56 allows the upper lip of the caller to be positioned on top of the membrane material 82 for controlling the tones produced like no other prior game call.

Figure 5:
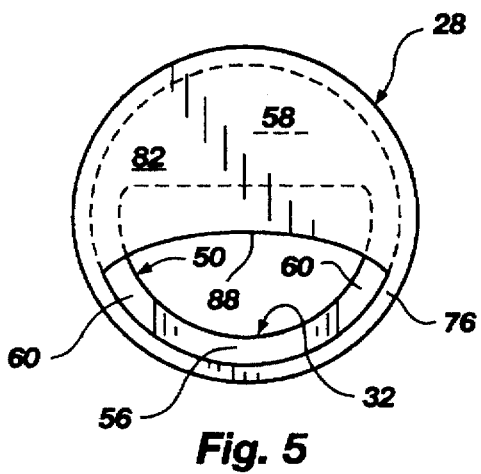
FIG. 5 is an end view of the mouthpiece assembly according to the present invention with a snap-on diaphragm positioned over the inlet end of the mouthpiece.
Figure 6:
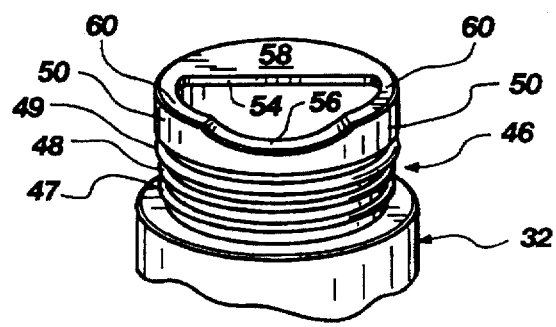
FIG. 6 is a perspective view of the inlet end of the mouthpiece without the snap-on diaphragm.
Figure 7:
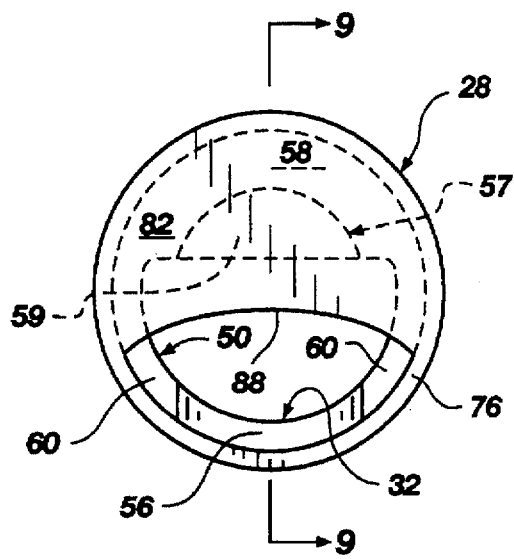
FIG. 7 is an end view of the mouthpiece assembly of the game call system, including a dished-out portion formed in the support shelf, with a snap-on diaphragm positioned over the inlet end of the mouthpiece.
Figure 8:
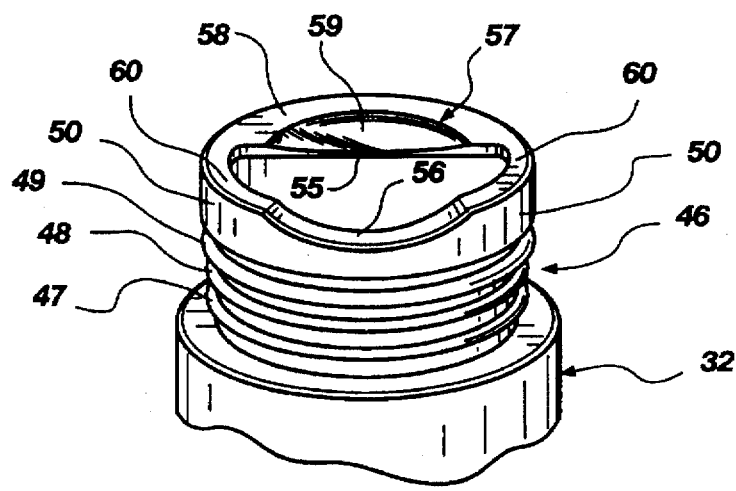
FIG. 8 is a perspective view of the inlet end of the mouthpiece of FIG. 7 without the snap-on diaphragm.
Figure 9:
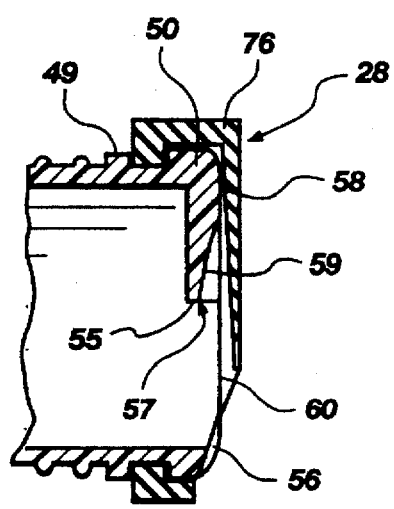
FIG. 9 is a sectional side elevation view, taken along the line 9—9 of FIG. 7, of the inlet end of the mouthpiece assembly including the dished-out area.

Referring now to FIGS. 7-9, an alternative embodiment of the present invention involves a mouthpiece body 32 having components similar to the embodiment shown in FIGS. 5-6 except, however, the support shelf 58 includes a generally concave dished-out area 57. The dished-out area includes a bowl having a curved, sloping top surface 59 that slopes gradually from the support shelf 58 from all sides. Although the dished-out area 57 is generally semicircular, it is to be understood that other sloping, curved, dished out areas may alternatively be used.

With respect to the embodiment of FIGS. 7-9, a side edge 55 is formed in the half-moon shaped support shelf 58. As shown in FIG. 8, the side edge 55 narrows toward the center of the dished-out portion 57, and widens as the dished-out portion extends toward the outerlying edges of the support shelf 58.

Figure 4:
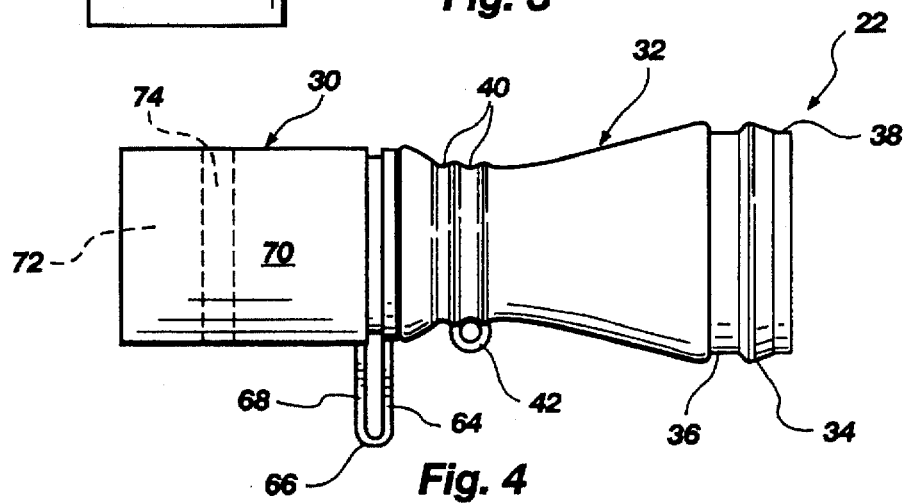
FIG. 4 is a side elevation view of the mouthpiece assembly of the game call system of FIG. 1 with an end cap positioned to cover the mouthpiece.

With reference to FIGS. 3-4, the end cap assembly 30 comprises a ring portion 62 securable around the periphery of the mouthpiece body 32. The attachment ring 62 is resiliently forced over the end of the mouthpiece and positioned inside of annular groove 44 (FIG. 10). A first integral extension flange 64 extends from the attachment ring 62 and leads to a hinge 66 which is attached, in turn, to a second integral extension flange 68 extending from an end cap 70. The end cap 70 and extending flange 68 pivot about the hinge 66 to cover the inlet end portion of the mouthpiece assembly 22 engagable by the user's mouth. As shown in FIG. 4, a storage area 72 is provided inside the end cap to allow accessories, such as spare snap-on diaphragm reeds and other call components to be stored. A retaining wall member 74, which may comprise a foam insert, is forcibly held inside the end cap 70 to prevent the accessory materials inside the storage area 72 from falling out when the end cap is removed from the mouthpiece, as shown in FIG. 3.

Figure 13:
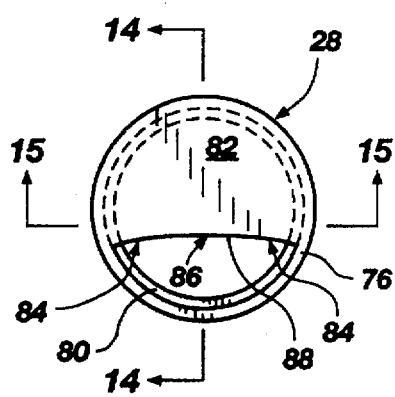
FIG. 13 is a front view of a snap-on diaphragm according to the present invention.
Figure 14:
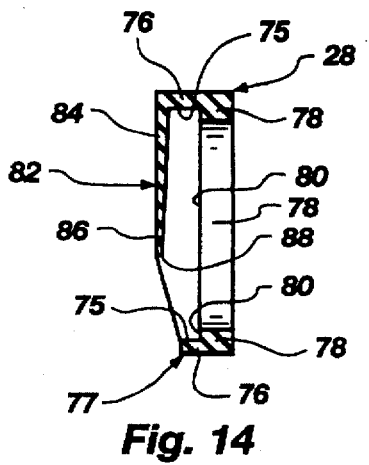
FIG. 14 is a sectional side elevation view, taken along the line 14—14 of FIG. 13, of a snap-on diaphragm according to the present invention.
Figure 15:
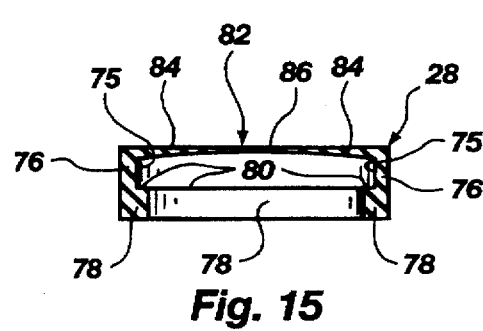
FIG. 15 is a sectional bottom view, taken along the line 15—15 of FIG. 13, of a snap-on diaphragm according to the present invention.

Referring now to FIGS. 5, 7, 9–10 and 13–15, details of a snap-on diaphragm reed 28 are shown. The snap-on reed includes an annular locking rim 76 which forms a peripheral base of the snap-on diaphragm. An annular locking flange 78 extends inwardly from the peripheral base 76 to create a locking edge 80 (FIGS. 14–15). As shown in FIG. 10, the locking edge 80 abuts the shoulder 52 of the end knob 50 while the peripheral base 76 engages the angular corner of the large rib 49 to form a male-female fit to retain the snap-on diaphragm in place over the end of the call. The locking edge 80 and shoulder 52 interconnection also prevents the snap-on diaphragm reed 28 from falling off the end of the call during use.

With reference to FIGS. 13–15, the snap-on diaphragm reed 28 includes generally a membrane material 82 extending between the annular peripheral base 76. The membrane preferably covers the entire support shelf 58 (FIGS. 5 & 7) and a portion of the semicircular aperture formed in the end of the mouthpiece body 32. As shown in FIG. 13, when the snap-on reed 28 is not installed over the inlet end of the mouthpiece body 32, a free edge 88 of the membrane 82 is shown as being slightly arcuate. When the snap-on reed is inserted over the inlet end of the mouthpiece body 32, as shown in FIGS. 5 and 7, the arcuate shape of the free edge 88 is accentuated. One purpose of the arcuate-shaped free edge 88 is to direct air toward the center of the call. The sides of the free edge 88 that attach to the peripheral base 76 are located the greatest distance from the support shelf 58, whereas the apex of the arcuate free edge 88 of the membrane is located the closest to the support shelf 58. Therefore, when the user places his or her lower lip into the concave portion 56, air forced will be directed through the call at a location proximate the apex of the arcuate free edge 88 and, therefore, will pass through the center of the call. This arrangement dramatically increases the effectiveness of the call.

As shown in FIGS. 10 and 14–15, the membrane 82 may comprise relatively thicker portions and relatively thinner portions. Alternatively, a constant-thickness membrane may be used. As shown, the membrane 82 becomes thinner as the diaphragm extends radially inwardly from the annular peripheral base 76. As shown in FIG. 7, therefore, radially outward membrane portions 84 that are relatively closer to the base 76 are thicker than the radially inward membrane portions 86 that are radially inward from the base 76. A space of approximately 0.004 inches is thus provided between the end surface 54 of the support shelf 58 and the membrane 82. Portions of the membrane that extend radially outwardly may contact the support shelf. This spacing allows the caller to create higher quality tones and also stimulate the low, raspy sound of a bugling bull elk. The gradual inward taper of the membrane also tends to direct air forced through the call toward the center of the opening formed in the end of the mouthpiece body 32. This results because the thinner inward portions 86 of the membrane have less resistance to stretching and deformation than the relatively thicker outer portions 84.

Figure 11:
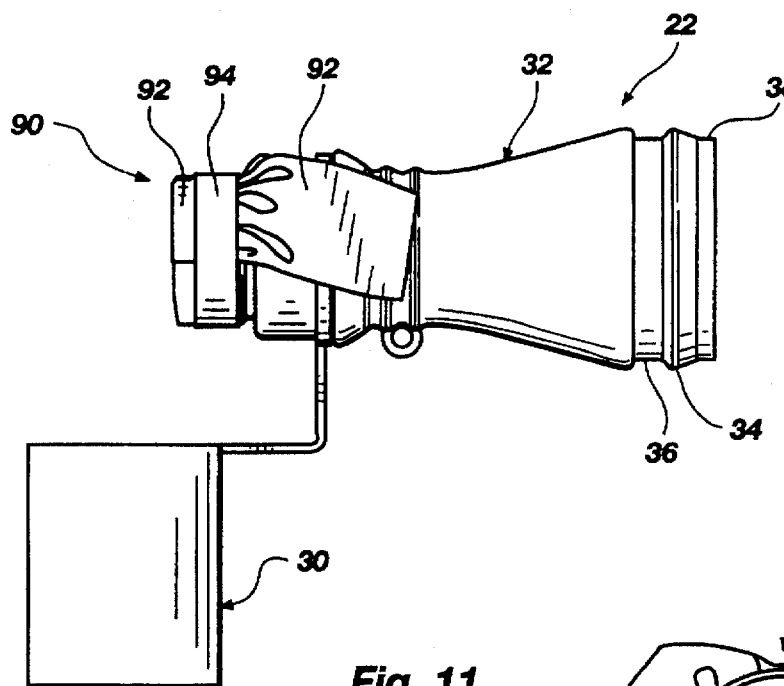
FIG. 11 is a side elevation view of the mouthpiece assembly with a sheet of membrane material secured over the inlet end of the mouthpiece.
Figure 12:
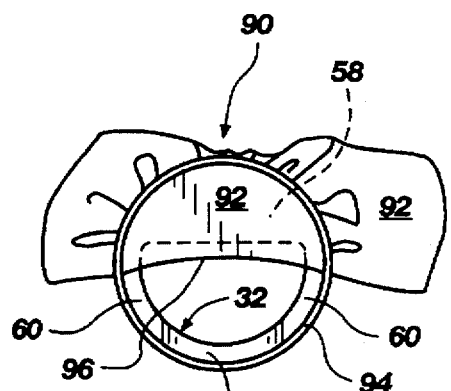
FIG. 12 is an end view of the mouthpiece assembly of FIG. 11.

FIGS. 11 and 12 show an alternative embodiment in the form of a membrane assembly for attaching to the end of the mouthpiece body 32. The membrane assembly includes a relatively thin elongate membrane sheet of material 92 for placing over the inlet end in tension. The membrane of material 92 covers the support shelf 58 and a portion of the opening formed in the end of the mouthpiece body 32. The free edge 96 is preferably positioned to be arcuate in shape, although it is to be understood that a straight edged diaphragm position could also be used with the novel aspects of the mouthpiece body 32. The edge 96 of the membrane 92 vibrates as air passes through the aperture at the inlet end of the call to create a tone similar to the particular animal being called. An elastic band 94 secures the sheet of membrane material 92 around the end of the call. As discussed above, the elastic band is preferably positioned inside of the recessed area 46 (FIG. 10) of the mouthpiece body 32. One or more of the annular ribs 47, 48, 49 engage membrane material and overlying elastic band within the recessed area 46 to prevent longitudinal movement relative to the mouthpiece body 32. The plurality of ribs 47, 48, 49 allow for the use of various widths of rubber bands or other fasteners to be used in combination with the call. It can be seen from the foregoing, therefore, that the call provides a high degree of versatility in terms of its use.

Figure 16:
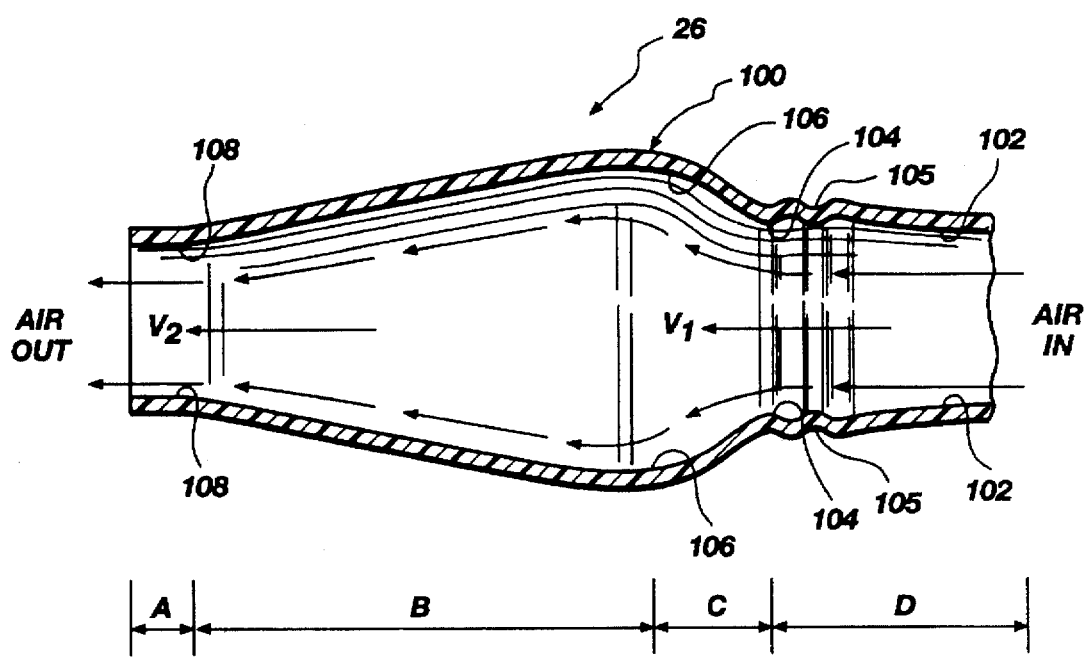
FIG. 16 is a sectional side elevation view of the volume chamber of the modular game call system of FIG. 1.

Referring now to FIG. 16, details of the sound chamber 26 are shown. The sound chamber 26 includes a uniquely shaped sound chamber body 100 which produces exceptionally high quality tones and resonance for calling elk. Air passes from the tube portion of the call 24 (FIGS. 1 and 2) into a first transition section 102 of the call. This first section has a length designated generally as D, which in one embodiment is approximately 1½ inches. The diameter of the transition section 102 varies beginning from the diameter of a typical tubular section 24 (FIGS. 1 and 2) to the beginning of the second or rapid expansion section 104. A lanyard groove 105 is formed on the outside of the sound chamber body to allow a lanyard to be attached to the outlet end of the call.

As mentioned, the transition section 102 terminates at the beginning of the rapid expansion section 104 of the sound chamber 26. The diameter of the sound chamber 26 dramatically increases at the rapid expansion section. The diameter of the sound chamber 26 becomes greatest at the end of the expansion section 104 and at the beginning of the narrowing section 106. The rapid expansion section has a length generally designated as C, which in one embodiment is approximately equal to 1 inch. This rapid expansion of the diameter occurs in a relatively short length of the call end piece 26. The result is that the velocity $V_1$ of air passing through the call slows dramatically as it enters into this portion of the call.

A narrowing section 106 follows downstream in the sound chamber 26. A gradual reduction in the diameter of the sound chamber 26 occurs in this section. The narrowing section 106 has a length designated generally as B, which in one embodiment is approximately 4 inches. Within the narrowing section 106, air passing through the sound chamber call increases its velocity. A maximum velocity $V_2$ of air is achieved at the beginning of the restricted section 108, located at the extreme end of the sound chamber 26. The restricted section 108 has a length designated generally as A, which in one embodiment is approximately equal to ½ inch.

The foregoing sound chamber 26 provides the call system 20 with an ability to produce highly authentic-sounding tones, volume, and resonance similar to the natural sounds of game animals, such as elk. Although the theory for the results is not completely and fully understood by the inventor, it is believed that the structure of the sound chamber may cause back pressures or fluid flow best explained by the Bernoulli Principle.

FIGS. 17–20 show an alternative embodiment of the modular game call system, which includes a mouthpiece body 200 having an inlet end 224 and an outlet end 222. The inlet end is configured for mounting a membrane thereon. In the embodiment of FIGS. 17–20, a resilient, stretchable, snap-on membrane 290 is installed on the inlet end 224 of the mouthpiece body. The snap-on membrane will be discussed in greater detail below.

The mouthpiece body 200 more specifically includes an annular peripheral edge 210 circumscribing the inlet end and a support shelf 212 which spans portions between the annular peripheral edge 210 of the inlet end. The support shelf is sized to underlie a portion of the membrane when mounted over the inlet end. As shown in FIG. 20, the support shelf defines generally a support shelf plane PL.

A recessed area 230 is formed in the support shelf 212. The recessed area 230 for its part is in the form of a valley and spans surrounding portions of the support shelf 212. The recessed area 230 terminates at a free edge 260 that generally comprises an upside down V-shaped edge (FIG. 19), and more particularly, comprises an upside down curved, V-shaped edge. As shown in FIG. 17, the inlet end 224 is inclined at an angle β, which is an acute angle relative to a perpendicularly extending axis relative to the longitudinal axis of the mouthpiece body. Preferably, angle β is approximately 15 degrees.

A concave lip portion 270 is formed on the annular peripheral edge at the inlet end of the mouthpiece body. The lip portion terminates on the peripheral edge at locations 272 (FIG. 18). The concave lip portion includes an inverted apex having a low point 274 (FIG. 19). It is intended that the user place his or her lower lip along the concave lip portion 270 to more easily enable the user to create the appropriate game calls. As shown in FIG. 20, the lowest point 274 of the inverted apex 274 falls at a location below the plane PL of the support shelf. The low point 274 should more easily allow the caller to affect vibrations of the membrane by contact with his or her lower lip.

As shown in FIGS. 17, 18, and 20, a snap-on membrane 290 in the form of a reed is shown as being installed over the inlet end of the mouthpiece body. The snap-on reed includes a thin membrane portion 292 spanning a peripheral ring 294. In addition, a shelf 296 extends inwardly from the peripheral ring to lock against a shoulder 297 (FIG. 19) formed below the annular peripheral edge 210 of the mouthpiece body. When the snap-on diaphragm reed 290 is placed appropriately on the call, the tension of the membrane 292 is preselected and should enable the desired sounds to be produced with the call. As shown in FIG. 18, the membrane forms a free, vibrating edge 298 which vibrates when the game call is used to produce the desired sounds. The free edge 298 terminates just before the end locations 272 of the concave lip portion 270.

As an alternative to the snap-on reed, a standard piece of latex (similar to what is described above) may be secured to the inlet end if desired. A plurality of ribs 285 are provided at a necked down area 283. The ribs 285 are intended to engage a rubber band or other fastener for holding a piece of latex or other suitable material in place on the inlet end of the call.

Other portions of this particular embodiment of the mouthpiece body 200 are similar to those described above. Circumferential grooves 240 provide locations at which one end of a lanyard may be attached. A ring 242 is integrally formed on the body at a location corresponding to one of the grooves 240 and facilitates attachment of a lanyard. A tapered outer surface 232 of the mouthpiece body terminates at groove 236, which corresponds to a portion of the tubular section (explained above) to which the mouthpiece body may be mounted. A ridge 234 snaps into a corresponding groove on the tubular section, and an extension segment 238 is formed on the end of the mouthpiece body to guide the mouthpiece body into the tubular portion. Also, as with the previous embodiment, a flange 264 from an end cap assembly (not shown) may be secured to the inlet end side of the mouthpiece body.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A game call system, comprising:

a mouthpiece body having an inlet end and an outlet end;

a membrane mounted to the inlet end, the membrane having an exposed edge which vibrates to produce sound;

a peripheral edge circumscribing the inlet end;

a support shelf formed at the inlet end of the mouthpiece section, the support shelf spanning portions between the annular peripheral edge of the inlet end, the support shelf underlying a portion of the membrane;

a free edge formed by the support shelf, the free edge comprising a curved portion.

2. A game call system according to claim 1, further comprising a concave portion formed at the inlet end on the peripheral edge.

3. A game call system according to claim 1, further comprising a concave portion formed at the inlet end on the peripheral edge, the concave portion comprising an inverted apex defining an extreme low point, wherein the support shelf defines a support shelf plane, the extreme low point falling below the support shelf plane.

4. A game call system according to claim 1 wherein a majority of the free edge is curvilinear.

5. A game call system according to claim 1 wherein the free edge is generally V-shaped.

6. A game call system according to claim 1 wherein the free edge is generally a curvilinear V-shaped edge.

7. A game call system according to claim 1, further comprising a recessed area formed in the support shelf, the free edge being formed along the recessed area of the support shelf.

8. A game call system according to claim 1, further comprising a recessed area formed in the support shelf, the free edge being exclusively formed along the recessed area of the support shelf.

9. A game call system according to claim 1, further comprising a recessed area formed in the support shelf, the free edge being formed along the recessed area of the support shelf;

wherein the free edge is generally curved and V-shaped.

10. A game call system according to claim 1 wherein the free edge of the support shelf is generally V-shaped and has a point of convergence, and further comprising an overhanging portion of the membrane which extends beyond the free edge of the support shelf, the overhaging portion of the membrane becoming increasingly greater from the point of convergence toward the exposed edge of the membrane.

11. A game call system, comprising:

a mouthpiece body having an inlet end and an outlet end;

a membrane mounted to the inlet end, the membrane having an exposed edge which vibrates to produce sound;

and an annular peripheral edge circumscribing the inlet end;

a support shelf formed at the inlet end of the mouthpiece section, the support shelf spanning portions between the annular peripheral edge of the inlet end, the support shelf being sized to underlie file a portion of said membrane mounted over the inlet end, file support shelf defining generally a support shelf plane;

a recessed area formed in the support shelf, the recessed area extending below the support shelf plane;

a free edge formed along the recessed area of the support shelf, the free edge being spaced from the exposed edge of the membrane, the free edge having a curved portion, the membrane overlapping the free edge such that a differential overlap is created between, the free edge of the support shelf and the membrane.

12. A game call system according to claim 11 wherein a majority of the free edge is nonlinear.

13. A game call system according to claim 11 wherein the free edge comprises a generally V-shaped edge.

14. A game call system according to claim 11 wherein the free edge comprises generally a curved, V-shaped edge.

15. A game call system according to claim 11 wherein the free edge is variably spaced from the exposed edge of the membrane.

16. A game call system according to claim 11 wherein the exposed edge of the membrane overlaps the free edge of the support shelf form an overlapping portion of the membrane, the overlapping portion being variable along the free edge.

17. A game call system according to claim 11 wherein the exposed edge comprises an arcuate shaped edge.

18. A modular game call system, comprising:

a tubular section having a first end and a second end;

a mouthpiece section coupled to the first end of the tubular section, the mouthpiece section comprising a mouthpiece body having an inlet end and an outlet end, a diaphragm comprising a membrane material coupled to the inlet end of the mouthpiece body, the membrane material defining a membrane plane, and peripheral edge formed at the inlet end of the mouthpiece body and defining a plane at an angle relative to a longitudinal axis of the mouthpiece body, the peripheral edge including a concave portion having a top surface, a portion of the top surface extending below the plane defined by the peripheral edge.

19. A modular game call according to claim 18 wherein the peripheral edge comprises an annular end knob extending circumferentially around the inlet end of the mouthpiece body, wherein the mouthpiece body includes a mouthpiece body circumference, the annular end knob having an annular end knob circumference that is greater than the mouthpiece body circumference.

20. A modular game call according to claim 18 wherein the peripheral edge comprises an annular end knob extending circumferentially around the inlet end of the mouthpiece body, the diaphragm comprising a locking rim engaging and surrounding the peripheral edge to lock the diaphragm position on the inlet end of the mouthpiece body.

21. A game call apparatus, comprising:

a main body portion;

a mouth-engaging end formed in the main body portion;

a sound-producing reed having a vibrating free edge coupled to the mouth-engaging end;

a concave portion formed in the mouth-engaging end opposite the vibrating free edge, the concave portion being spaced from the sound-producing reed.

22. A game call apparatus according to claim 21 further comprising an annular end knob formed at the mouth-engaging end and extending circumferentially around the mouth-engaging end of the mouthpiece body, the sound-producing reed including a locking edge engaging and surrounding the annular end knob to lock the diaphragm in position on the mouth-engaging end of the mouthpiece body.

23. A game call apparatus according to claim 21 further comprising an annular end knob formed at the mouth-engaging end and extending circumferentially around the mouth-engaging end of the mouthpiece body, the sound-producing reed including a locking edge engaging and surrounding the annular end knob to lock the diaphragm in position on the mouth-engaging end of the mouthpiece body, and further comprising a rib extending radially outwardly from the mouthpiece body, the locking edge engaging the rib to prevent longitudinal displacement of the locking edge relative to the mouthpiece body.

24. A game call apparatus according to claim 21 wherein the mouthpiece body further comprises a support shelf formed at the mouth-engaging end, the support shelf underlying the reed, and further comprising a curved, downwardly sloping top surface recessed from the support shelf.

25. A game call apparatus according to claim 21 wherein the sound-producing reed defines a free plane and wherein the concave portion extends entirely below the reed plane.

26. A game call apparatus according to claim 21 wherein the sound-producing reed is a snap-on diaphragm.

27. A game call apparatus according to claim 21 wherein the vibrating free edge of the sound-producing reed comprises an arcuate shaped edge.

28. A game call apparatus according to claim 21 further comprising an annular end knob formed at the mouth-engaging end and extending circumferentially around the mouth-engaging end, the concave portion formed in the annular end knob.

29. A game call apparatus according to claim 21 wherein the sound-producing reed defines a reed plane and wherein the concave portion extends at least partially below the reed plane.

* * * * *

UNITED STATES PATENT AND TRADEMARK OFFICE
CERTIFICATE OF CORRECTION

PATENT NO. : 5,735,725
DATED : April 7, 1998
INVENTOR(S) : Wilbur R. Primos

It is certified that error appears in the above-identified patent and that said Letters Patent is hereby corrected as shown below:

Column 5,
Line 30, "groove" should be -- grooves --.

Column 7,
Line 55, "stimulate" should be -- simulate --.

Column 11,
Line 11, "file" should be deleted.
Line 12, "file" should be replaced with -- the --.
Line 34, -- to -- should be inserted after "shelf".

Column 12,
Line 5, -- in -- should be inserted after "diaphragm".
Line 41, "free" should be replace with -- reed --.

Signed and Sealed this

Twelfth Day of March, 2002

Attest:

*Attesting Officer*

JAMES E. ROGAN
*Director of the United States Patent and Trademark Office*